(12) United States Patent
Hinojosa

(10) Patent No.: US 7,325,270 B2
(45) Date of Patent: Feb. 5, 2008

(54) DIP STICK WIPER APPARATUS

(76) Inventor: Juan J. Hinojosa, P.O. Box 156, Pearsall, TX (US) 78061

( * ) Notice: Subject to any disclaimer, the term of this patent is extended or adjusted under 35 U.S.C. 154(b) by 0 days.

(21) Appl. No.: 11/485,021

(22) Filed: Jul. 12, 2006

(65) Prior Publication Data
US 2007/0011837 A1 Jan. 18, 2007

Related U.S. Application Data

(60) Provisional application No. 60/699,122, filed on Jul. 15, 2005.

(51) Int. Cl.
*A47L 25/00* (2006.01)
*F01M 11/12* (2006.01)

(52) U.S. Cl. .............. 15/220.4; 15/210.1; D32/44

(58) Field of Classification Search .............. None
See application file for complete search history.

(56) References Cited

U.S. PATENT DOCUMENTS 3,686,702 A   8/1972   Jordan
4,017,935 A   4/1977   Hernandez
4,380,841 A   4/1983   Thomas
4,419,781 A   12/1983  Meegan
5,231,728 A   8/1993   Schillinger

*Primary Examiner*—David Redding

(57) ABSTRACT

A dip stick wiper apparatus includes a frame which includes a first frame leg, a second frame leg, and a resilient frame bridge connected therebetween. A first absorbent member is connected to an inside portion of the first frame leg, and a second absorbent member is connected to and inside portion of the second frame leg. The respective absorbent members can be made of absorbent sponge material. The first frame leg and the second frame leg are spaced apart from each other by a dip-stick reception gap and are parallel to each other. To wipe oil off of a dip stick, the dip stick is placed in the dip-stick reception gap and pulled upward so that the oil from the dip stick is absorbed into the first and second absorbent members. Preferably, a magnet member is connected to an outside portion of either the first frame leg or the second frame leg.

4 Claims, 3 Drawing Sheets

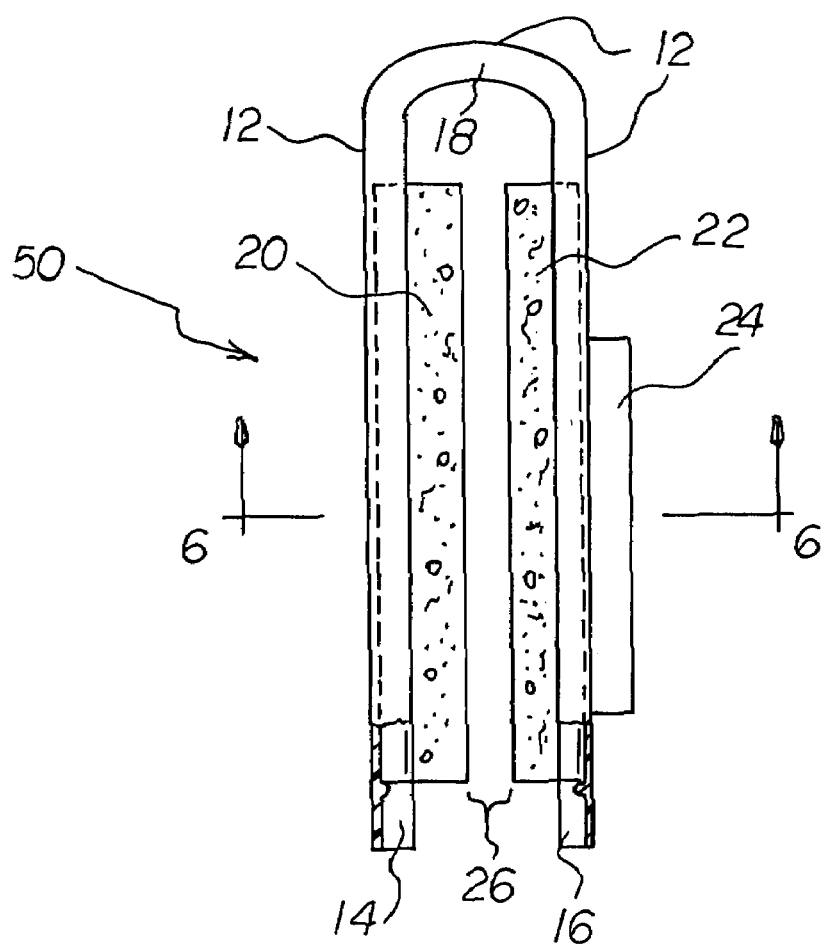
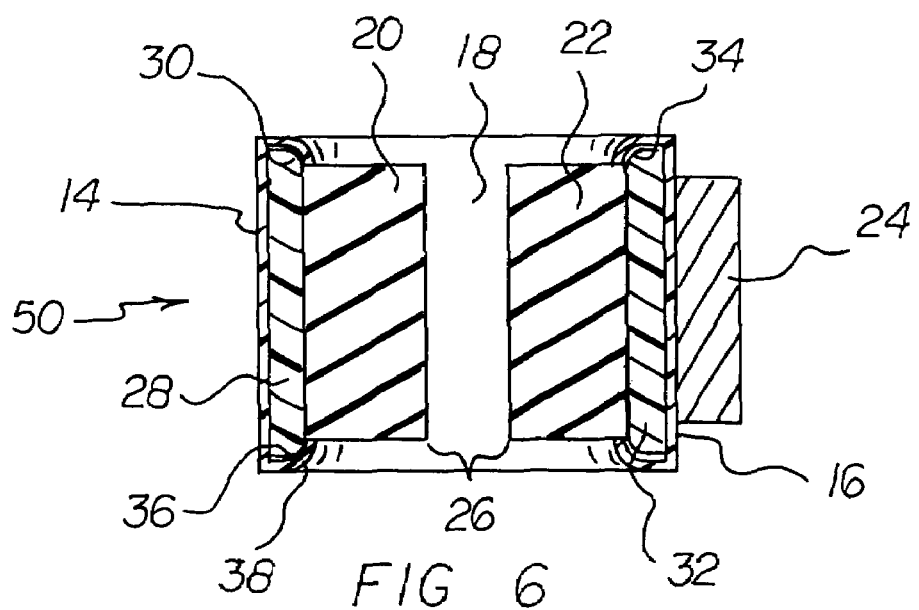

DIP STICK WIPER APPARATUS

CROSS-REFERENCE TO RELATED APPLICATION

This application claims priority based upon my copending Provisional Application Ser. No. 60/699,122; filed Jul. 15, 2005.

BACKGROUND OF THE INVENTION

1. Field of the Invention

The present invention relates generally to wipers for liquids, and, more particularly, to wipers for liquids especially adapted for wiping engine oil off of a dip stick.

2. Description of the Prior Art

Devices for wiping engine oil of dip sticks are well known in the art. In this respect, throughout the years, a number of innovations have been developed relating to wipers for oil dip sticks, and the following U.S. patents are representative of some of those innovations: U.S. Pat. Nos. 3,686,702, 4,017,935, 4,380,841, 4,419,781, and 5,231,728.

More specifically, U.S. Pat. No. 3,686,702 discloses an oil stick wiper that includes a wiping region which includes two opposite wiping portions which are normally in contact with each other. When a dip stick is to be wiped, the dip stick must be wedged between the two opposite wiping portions. With the two opposite wiping portions normally in direct contact with each other, it may be difficult to properly insert a dip stick between the in-contact wiping portions. In this respect, it would be desirable if a dip stick wiper device were provided having a gap between two opposite wiping portions. The gap permits easy insertion of a dip stick therebetween.

Each of U.S. Pat. Nos. 4,017,935 and 4,419,781 discloses dip stick cleaning device which is attached to a portion of a conventional automobile engine. Any device that is attached to a portion of a conventional automobile engine is exposed to the high heat levels and vibrations emanating from such an engine. Such heat levels and vibrations can lead to rapid deterioration of absorbent portions of the device. Therefore, rather than having a dip stick cleaning device attached to a portion of a conventional automobile engine, it would be desirable if a dip stick wiper device were provided which is not attached to a portion of a conventional automobile engine.

U.S. Pat. No. 4,380,841 discloses an oil dip stick wiper unit which includes two opposing wiper blocks that are connected to other by a hinge located between respective ends of each of the wiper blocks. The wiper blocks are oriented with respect to each other in a V-shaped orientation. With this orientation of wiper blocks, the top portions of the wiper blocks are not in contact with the dip stick when the dip stick is placed between the wiper blocks. As a result, only the lower portions of the wiper blocks provide direct absorption contact with the dip stick. Rather than having such a V-shaped orientation of wiper blocks, it would be desirable if a dip stick wiper device were provided which includes wiper blocks that are in a parallel orientation with respect to each other.

U.S. Pat. No. 5,231,728 discloses a disposable dip stick wiping device in which two absorbent portions are separated from each other by a dip-stick-reception gap. The two absorbent portions are substantially free standing and are supported by a substantially rigid base panel. A pair of side panels are connected to the base panel by a pair of hinges. The side panels are normally oriented perpendicular to the two absorbent portions, and those side panels can be swung around the respective hinges to be oriented parallel to the two absorbent portions. Rather than having the complexity of a pair of side panels connected to a pair of hinges, it would be desirable if a dip stick wiper device were provided which does not include a pair of hinged side panels.

Still other features would be desirable in a dip stick wiper apparatus. For example, an efficient and simple way to attach one item to a ferrous-metal based support is by the use of a magnet. In this respect, it would be desirable if a dip stick wiper device were provided which included a magnet for attaching the device to a ferrous-metal based support.

When a wiper has been used a number of times, the absorbent material in the wiper may become saturated with oil and lose its absorbency properties. In this respect, it would be desirable if a dip stick wiper device were provided which included easily replaceable absorbent units that can easily be replaced when they become saturated with oil.

Thus, while the foregoing body of prior art indicates it to be well known to use dip stick wiper devices, the prior art described above does not teach or suggest a dip stick wiper apparatus which has the following combination of desirable features: (1) includes a gap between two opposite wiping portions so that a dip stick can fit readily into the gap; (2) is not attached to a portion of a conventional automobile engine; (3) includes wiper blocks that are in a parallel orientation with respect to each other; (4) does not include a pair of hinged side panels; (5) can include a magnet for attaching the device to a ferrous-metal based support; and (6) can include easily replaceable absorbent units that can easily be replaced when they become saturated with oil. The foregoing desired characteristics are provided by the unique dip stick wiper apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a dip stick wiper apparatus which includes a frame which includes a first frame leg, a second frame leg, and a resilient frame bridge connected between the first frame leg and the second frame leg. A first absorbent member is connected to an inside portion of the first frame leg, and a second absorbent member is connected to and inside portion of the second frame leg. The first absorbent member and the second absorbent member can be made of absorbent sponge material. The first frame leg and the second frame leg are spaced apart from each other by a dip-stick reception gap. To wipe oil off of a dip stick, the dip stick is placed in the dip-stick reception gap and pulled upward so that the oil from the dip stick is absorbed into the first absorbent member and the second absorbent member. The first absorbent member and the second absorbent member are oriented in a parallel orientation with respect to each other.

Preferably, a magnet member is connected to an outside portion of either the first frame leg or the second frame leg.

Preferably, the frame bridge is comprised of a resilient material. Preferably, the first frame leg, the second frame leg, and the frame bridge are in the form of a unified, integrated frame structure.

With one embodiment of the invention, the first absorbent member is attached to the first frame leg with a quantity of an adhesive material, and the second absorbent member is attached to the second frame leg with a quantity of an adhesive material.

With another embodiment of the invention, the first absorbent member is attached to a first base member, and the first frame leg includes a first-base reception region which receives the first base member. The second absorbent member is attached to a second base member, and the second frame leg includes a second-base reception region which receives the second base member.

Preferably, the first absorbent member and the first base member are formed as a unified, integrated structure, and the second absorbent member and the second base member are formed as a unified, integrated structure. Preferably, each of the first base member and second base member includes an edge connector portion, and each of the first-base reception region and second-base reception region includes a complementary edge connector portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dip stick wiper apparatus which has all of the advantages of the prior art and none of the disadvantages.

It is another object of the present invention to provide a new and improved dip stick wiper apparatus which may be easily and efficiently manufactured and marketed.

It is a further object of the present invention to provide a new and improved dip stick wiper apparatus which is of durable and reliable construction.

An even further object of the present invention is to provide a new and improved dip stick wiper apparatus which is susceptible of a low cost of manufacture with regard to both materials and labor, and which accordingly is then susceptible of low prices of sale to the consuming public, thereby making such dip stick wiper apparatus available to the buying public.

Still yet a further object of the present invention is to provide a new and improved dip stick wiper apparatus which includes a gap between two opposite wiping portions so that a dip stick can fit readily into the gap.

Still another object of the present invention is to provide a new and improved dip stick wiper apparatus that is not attached to a portion of a conventional automobile engine.

Yet another object of the present invention is to provide a new and improved dip stick wiper apparatus which includes wiper blocks that are in a parallel orientation with respect to each other.

Even another object of the present invention is to provide a new and improved dip stick wiper apparatus that does not include a pair of hinged side panels.

Still a further object of the present invention is to provide a new and improved dip stick wiper apparatus which can include a magnet for attaching the device to a ferrous-metal based support.

Yet another object of the present invention is to provide a new and improved dip stick wiper apparatus that can include easily replaceable absorbent units that can easily be replaced when they become saturated with oil.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a side view of a second embodiment of the invention wherein absorbent sponges are removable and replaceable with respect to the frame.

FIG. 6 is an enlarged cross-sectional view of the embodiment of the invention shown in FIG. 5, taken along line 6-6 thereof.

DESCRIPTION OF THE PREFERRED EMBODIMENT

Figure 1:
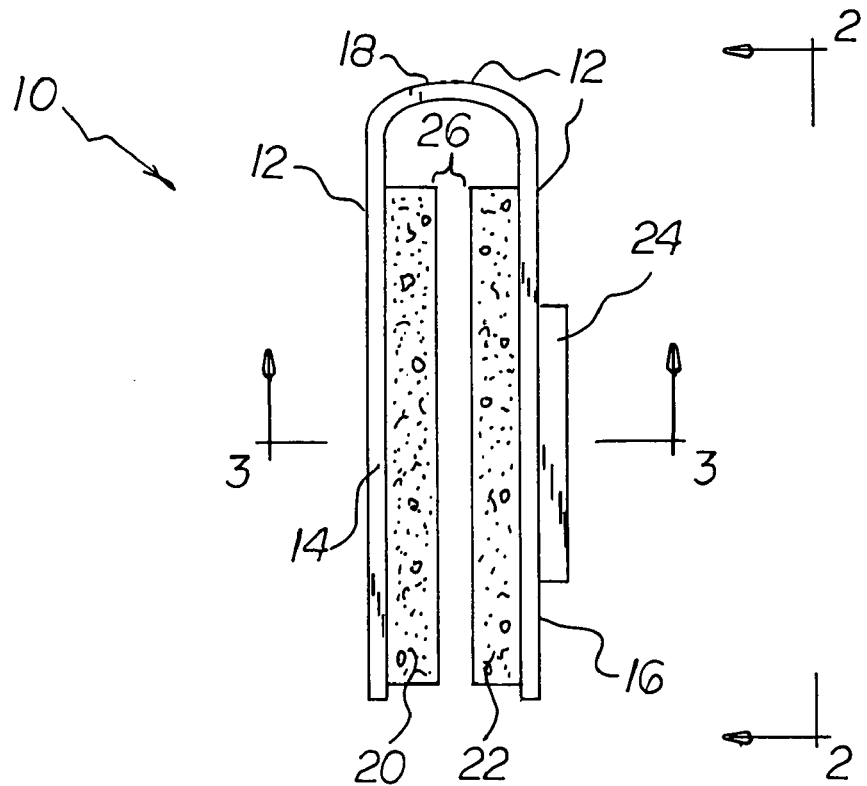
FIG. 1 is a side view showing a first embodiment of the dip stick wiper apparatus of the invention, wherein absorbent sponges are secured to the frame with an adhesive.
Figure 2:
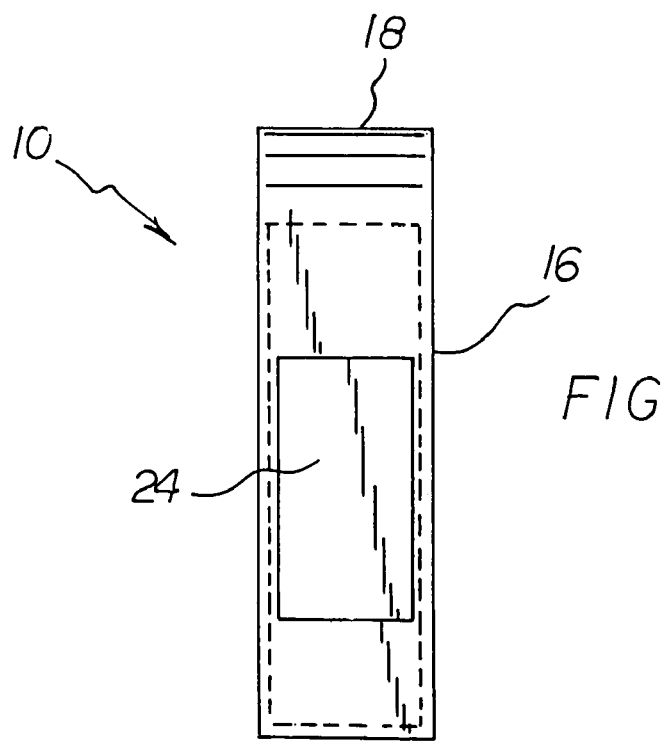
FIG. 2 is a front view of the embodiment of the dip stick wiper apparatus shown in FIG. 1 taken along line 2-2 of FIG. 1.
Figure 3:
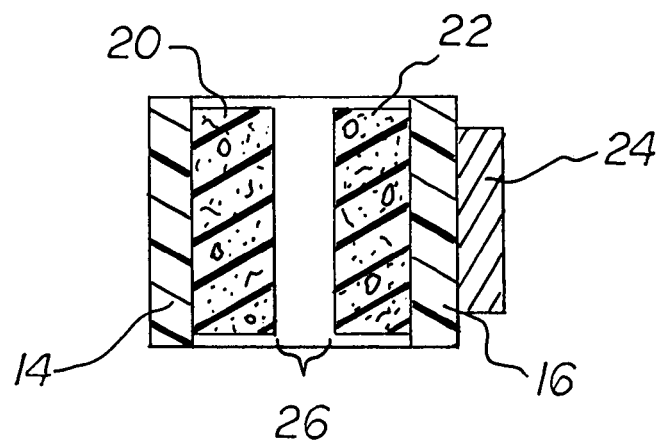
FIG. 3 is a cross-sectional view of the embodiment of the dip stick wiper apparatus of FIG. 1 taken along line 3-3 thereof.

With reference to the drawings, a new and improved dip stick wiper apparatus embodying the principles and concepts of the present invention will be described.

Turning to FIGS. 1-4, there is shown a first embodiment of the dip stick wiper apparatus of the invention generally designated by reference numeral 10. In the first embodiment, a dip stick wiper apparatus 10 includes a frame 12 which includes a first frame leg 14, a second frame leg 16, and a resilient frame bridge 18 connected between the first frame leg 14 and the second frame leg 16. A first absorbent member 20 is connected to an inside portion of the first frame leg 14, and a second absorbent member 22 is connected to and inside portion of the second frame leg 16. The first absorbent member 20 and the second absorbent member 22 can be made of absorbent sponge material. The first absorbent member 20 and the second absorbent member 22 are oriented in a parallel orientation with respect to each other.

The first frame leg 14 and the second frame leg 16 are spaced apart from each other by a dip-stick reception gap 26. Preferably, a magnet member 24 is connected to an outside portion of either the first frame leg 14 or the second frame leg 16. Preferably, the frame bridge 18 is comprised of a resilient material. Preferably, the first frame leg 14, the second frame leg 16, and the frame bridge 18 are in the form of a unified, integrated frame 12 structure.

More specifically, with respect to the embodiment of the invention shown in FIGS. 1-4, the first absorbent member 20 is attached to the first frame leg 14 with a quantity of an adhesive material, and the second absorbent member 22 is attached to the second frame leg 16 with a quantity of an adhesive material.

Turning to FIGS. 5-6, a second embodiment 50 of the invention is shown. Reference numerals are shown that correspond to like reference numerals that designate like elements shown in the other figures. In addition, the first absorbent member 20 is attached to a first base member 28, and the first frame leg 14 includes a first-base reception region 30 which receives the first base member 28. The second absorbent member 22 is attached to a second base member 32, and the second frame leg 16 includes a second-base reception region 34 which receives the second base member 32.

Preferably, the first absorbent member 20 and the first base member 28 are formed as a unified, integrated structure, and the second absorbent member 22 and the second base member 32 are formed as a unified, integrated structure. Preferably, the unified, integrated structure of the first absorbent member 20 and the first base member 28 is a removable and replaceable unit with respect to the first-base reception region 30. Similarly, the unified, integrated structure of the second absorbent member 22 and the second base member 32 is a removable and replaceable unit with respect to the second-base reception region 34. Each of the first base member 28 and second base member 32 includes an edge connector portion 36, and each of the first-base reception region 30 and second-base reception region 34 includes a complementary edge connector portion 38.

Figure 4:
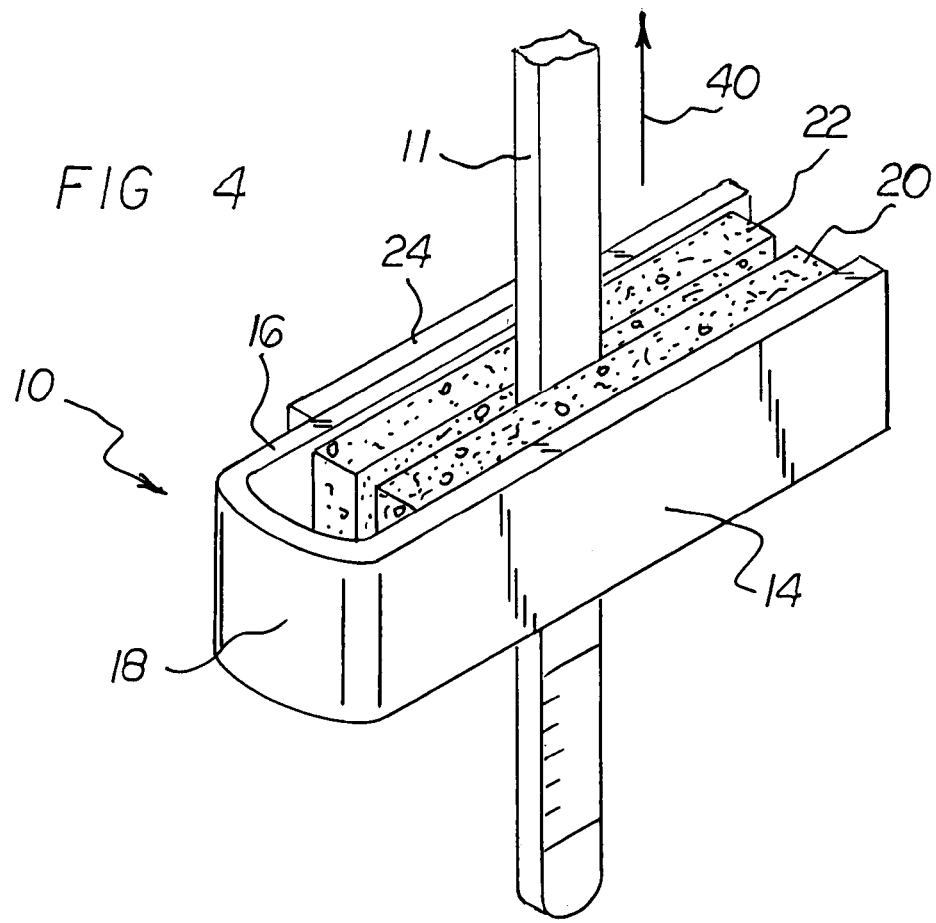
FIG. 4 is a perspective view of the embodiment of the invention shown in FIGS. 1-3 in use, wiping a dip stick.

To use any embodiment of the invention, a user pulls the apparatus off of a ferromagnetic support surface, if any is used, which supports the apparatus by means of magnetic attachment with the magnet member 24. Then, the user holds the embodiment of the invention in one hand, and the user holds a dip stick 11 in the other hand. Then, the user inserts the dip stick 11 into the dip-stick reception gap 26 between the first absorbent member 20 and the second absorbent member 22, such as shown in FIG. 4, whereby the dip stick 11 is squeezed between the first absorbent member 20 and the second absorbent member 22. Then, the user pulls the dip stick 11 upward, as shown by directional arrow 40, whereby the dip stick 11 is wiped by the first absorbent member 20 and the second absorbent member 22. As the dip stick 11 is wiped, oil on the dip stick 11 is wiped off of the dip stick 11 and is absorbed into the first absorbent member 20 and the second absorbent member 22.

When the first absorbent member 20 and the second absorbent member 22 become saturated with oil, the first absorbent member 20 and the second absorbent member 22 can be contacted with other absorbent materials, such as paper towels, to draw oil out from the first absorbent member 20 and the second absorbent member 22. In addition, the first absorbent member 20 and the second absorbent member 22 can be washed with soap and water.

More specifically with respect to the second embodiment 50 of the invention, when sufficiently dirty or saturated with oil, the unified, integrated structure of the first absorbent member 20 and the first base member 28 and the unified, integrated structure of the second absorbent member 22 and the second base member 32 can be removed from their respective base reception regions 30,34 and replaced with clean, unsaturated units.

The dip stick wiper apparatus 10 eliminates the need to use dirty and oily rags and paper in one's car. Also, the dip stick wiper apparatus 10 eliminates the frustrating time of looking for something to clean a dip stick. The dip stick wiper apparatus 10 of the invention provides a handy tool to wipe the dip sticks for all of the oil-containing systems of the motor vehicle, and the dip stick wiper apparatus 10 can be used over and over again.

The dip stick wiper apparatus 10 of the invention can be used with dip sticks on substantially any motor, such as cars, trucks, motorcycles, and lawn mowers.

The dip stick wiper apparatus 10 of the invention can be designated "DIP-STICK SQUEEGEE".

Although the dip stick wiper apparatus 10 of the invention is especially useful for cleaning dip sticks, the apparatus can also be used for cleaning thin objects such as knives and other cooking utensils. In this respect, the dip stick wiper apparatus 10 can be used by hunters, campers, and homemakers.

The components of the dip stick wiper apparatus of the invention can be made from inexpensive and durable metal, plastic, and sponge materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved dip stick wiper apparatus that is low in cost, relatively simple in design and operation, and which may advantageously include a gap between two opposite wiping portions so that a dip stick can fit readily into the gap. With the invention, a dip stick wiper apparatus is provided which is not attached to a portion of a conventional automobile engine. With the invention, a dip stick wiper apparatus is provided which includes wiper blocks that are in a parallel orientation with respect to each other. With the invention, a dip stick wiper apparatus is provided which does not include a pair of hinged side panels. With the invention, a dip stick wiper apparatus is provided which can include a magnet for attaching the device to a ferrous-metal based support. With the invention, a dip stick wiper apparatus is provided which can include easily replaceable absorbent units that can easily be replaced when they become saturated with oil.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

The invention claimed is:

1. A dip stick wiper apparatus, comprising:
a frame which includes a first frame leg, a second frame leg, and a resilient frame bridge connected between said first frame leg and said second frame leg,
a first absorbent member connected to an inside portion of said first frame leg, and
a second absorbent member connected to and inside portion of said second frame leg,
wherein said first absorbent member and said second absorbent member are spaced apart from each other by a dip-stick reception gap, and
wherein said first absorbent member and said second absorbent member are oriented in a parallel orientation with respect to each other, and
wherein:
said first absorbent member is attached to a first base member,
said first frame leg includes a first-base reception region which removably receives said first base member,
said second absorbent member is attached to a second base member, and
said second frame leg includes a second-base reception region which removably receives said second base member, and
wherein:
said first absorbent member and said first base member are formed as a unified, integrated structure, and
said second absorbent member and said second base member are formed as a unified, integrated structure, and
wherein:
each of said first base member and second base member includes an edge connector portion, and
each of said first-base reception region and second-base reception region includes a complementary edge connector portion for removably retaining said first base member and said second base member, respectively.

2. The apparatus of claim 1 wherein said first absorbent member and said second absorbent member are made of absorbent sponge material.

3. The apparatus of claim 1, further including:
a magnet member connected to an outside portion of either said first frame leg or said second frame leg.

4. The apparatus of claim 1 wherein said first frame leg, said second frame leg, and said frame bridge are in the form of a unified, integrated frame structure.

* * * * *